United States Patent
Hoke et al.

(10) Patent No.: US 9,120,366 B2
(45) Date of Patent: Sep. 1, 2015

(54) MONITORING AIR FILTER STATUS IN AUTOMOTIVE HVAC SYSTEM

(75) Inventors: Paul B. Hoke, Plymouth, MI (US); William S. Johnston, South Lyon, MI (US); James R. Hurd, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 686 days.

(21) Appl. No.: 13/457,542

(22) Filed: Apr. 27, 2012

(65) Prior Publication Data
US 2013/0288585 A1 Oct. 31, 2013

(51) Int. Cl.
*B60H 3/06* (2006.01)

(52) U.S. Cl.
CPC ...... *B60H 3/0616* (2013.01); *B60H 2003/0683* (2013.01)

(58) Field of Classification Search
CPC .............. B60H 3/0616; B60H 2003/0683
USPC ............................ 454/75; 340/607
See application file for complete search history.

(56) References Cited

U.S. PATENT DOCUMENTS

| | | | |
|---|---|---|---|
| 5,689,963 A * | 11/1997 | Bahel et al. | 62/129 |
| 5,971,066 A * | 10/1999 | Oehring et al. | 165/202 |
| 5,983,649 A * | 11/1999 | Aislabie et al. | 62/133 |
| 6,052,998 A * | 4/2000 | Dage et al. | 62/89 |
| 6,283,849 B1 * | 9/2001 | Shields | 454/75 |
| 6,298,291 B1 * | 10/2001 | Davis et al. | 701/36 |
| 6,448,896 B1 | 9/2002 | Bankus et al. | |
| 6,582,295 B1 * | 6/2003 | Abouchaar | 454/158 |
| 6,988,670 B2 * | 1/2006 | Keen et al. | 236/49.3 |
| 6,993,414 B2 * | 1/2006 | Shah | 700/276 |
| 7,331,188 B2 * | 2/2008 | Quilliard et al. | 62/150 |
| 7,637,031 B2 * | 12/2009 | Salim et al. | 34/437 |
| 7,784,291 B2 | 8/2010 | Butler | |
| 2005/0262853 A1 * | 12/2005 | Salim et al. | 62/59 |
| 2006/0130497 A1 * | 6/2006 | Kang et al. | 62/127 |
| 2007/0013534 A1 | 1/2007 | DiMaggio | |
| 2007/0144120 A1 * | 6/2007 | Kawasaki et al. | 55/385.3 |
| 2007/0146148 A1 * | 6/2007 | Kawasaki et al. | 340/607 |
| 2007/0163929 A1 * | 7/2007 | Stiles et al. | 210/97 |
| 2008/0119126 A1 * | 5/2008 | Shizuo et al. | 454/75 |
| 2008/0156887 A1 * | 7/2008 | Stanimirovic | 236/12.1 |
| 2010/0204945 A1 * | 8/2010 | Shahi et al. | 702/100 |
| 2011/0185895 A1 * | 8/2011 | Freen | 95/25 |
| 2013/0145647 A1 * | 6/2013 | Kim et al. | 34/492 |

* cited by examiner

*Primary Examiner* — Steven B McAllister
*Assistant Examiner* — Frances F Hamilton
(74) *Attorney, Agent, or Firm* — James Dottavio; MacMillan, Sobanski & Todd, LLC

(57) ABSTRACT

A system and methods are provided for monitoring for a clogged or unclogged state of an air filter in an automotive HVAC system. The HVAC system includes a blower having a blower motor providing a driven airflow. A plurality of outlet registers is controllable to provide a plurality of circulation modes. An evaporator selectably cools the driven airflow, and the air filter passes the driven airflow. The method enters a baseline condition, wherein the baseline condition includes applying a moisture purge to the evaporator and selection of a predetermined circulation mode. The blower motor is controlled to maintain a testing speed. An energization of the blower motor is quantified while maintaining the testing speed. The energization is compared to a base value derived according to the baseline condition with the air filter in an unclogged state. A replacement action is triggered when the energization is greater than the base value.

22 Claims, 5 Drawing Sheets

| Mode | Blower | Inlet | Base Value |
|---|---|---|---|
| Floor | High | Recirc | $B_1$ |
| Floor | High | Fresh | $B_2$ |
| Floor | Medium | Recirc | $B_3$ |
| Floor | Medium | Fresh | $B_4$ |
| Floor | Low | Recirc | $B_5$ |
| Floor | Low | Fresh | $B_6$ |
| Panel | High | Recirc | $B_7$ |
| Panel | High | Fresh | $B_8$ |
| Panel | Medium | Recirc | $B_9$ |
| ⋮ | | | |
| Defrost | High | Recirc | $B_X$ |
| ⋮ | | | |
| Floor/Def | High | Recirc | $B_Y$ |
| ⋮ | | | | ent
MONITORING AIR FILTER STATUS IN AUTOMOTIVE HVAC SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cabin air filters for automotive vehicles, and, more specifically, to detecting when an air filter has become clogged and is in need of replacement.

Because of the potential for airborne contaminates, cabin air filters are often included in the ventilation systems of automotive vehicles. These replaceable filters need to be changed when they become clogged with filtered particles and dirt. Dedicated sensing systems are known that can identify the filter state and provide an indication to the user to let them know when an air filter needs to be replaced. The known prior art systems have used combinations of dedicated sensors (such as a pressure sensor for determining pressure drop across a filter) and special housing design features (such as an air bypass channel). Such systems have proven costly and consume packaging space that is in short supply. They also add complexity to the manufacturing of the automotive heating, ventilation, and air conditioning (HVAC) system. Consequently, many vehicles are manufactured without any automatic monitoring of the state of the air filter. Instead, the manufacturer provides written recommendations to the user to replace the filter after a certain period of time or after a predetermined number of miles driven. These recommendations are determined based upon average conditions, so any particular user may have a clogged filter before expiration of the recommended interval or they may end up replacing an unclogged filter unnecessarily. Therefore, it would desirable to monitor the state of an air filter without dedicated sensors or special housing features.

It has been proposed to use the increased resistance to air flow through a dirty air filter to detect the need for a filter change. For example, U.S. Pat. No. 6,448,896 to Bankus et al. issues a command to a blower motor for a particular speed. The resulting speed is compared to a predetermined fan speed that would normally occur when the filter is dirty. However, such prior systems have been unreliable and have been found to give inaccurate results due to failures to recognize and control all significant variables impacting the air flow.

SUMMARY OF THE INVENTION

The present invention monitors for a clogged or unclogged state of an air filter without requiring a separate filter-check sensor, thereby avoiding the cost, weight, and packaging space of a separate sensor and its associated wiring and structural features. A reminder for replacing the air filter is made only when it is actually needed, thereby saving the user from either unnecessary filter changes or decreased ventilation performance when a needed replacement is delayed.

In one aspect of the invention, a method is provided for monitoring for a clogged or an unclogged state of an air filter in an automotive HVAC system. The HVAC system includes a blower having a blower motor providing a driven airflow. A plurality of outlet registers is controllable to provide a plurality of circulation modes. An evaporator selectably cools the driven airflow, and the air filter passes the driven airflow. The method comprises the steps of entering a baseline condition, wherein the baseline condition includes applying a moisture purge to the evaporator and selection of a predetermined circulation mode. The blower motor is controlled to maintain a testing speed. An energization of the blower motor is quantified while maintaining the testing speed. The energization is compared to a base value derived according to the baseline condition with the air filter in an unclogged state. A replacement action is triggered when the energization is greater than the base value.

DETAILED DESCRIPTION OF PREFERRED EMBODIMENTS

The present invention uses a speed-controlled blower motor wherein the energization required to obtain a particular motor speed is compared to the energization required when an unclogged filter is present. Importantly, the HVAC system is placed into a baseline condition (i.e., a predetermined configuration including a mode of distribution of the airflow) so that variabilities in the airflow not caused by the air filter state are minimized. In particular, moisture accumulation on the evaporator core has been found to significantly influence the resistance to airflow through the HVAC system. Therefore, the baseline condition includes applying a moisture purge to the evaporator.

Figure 1:
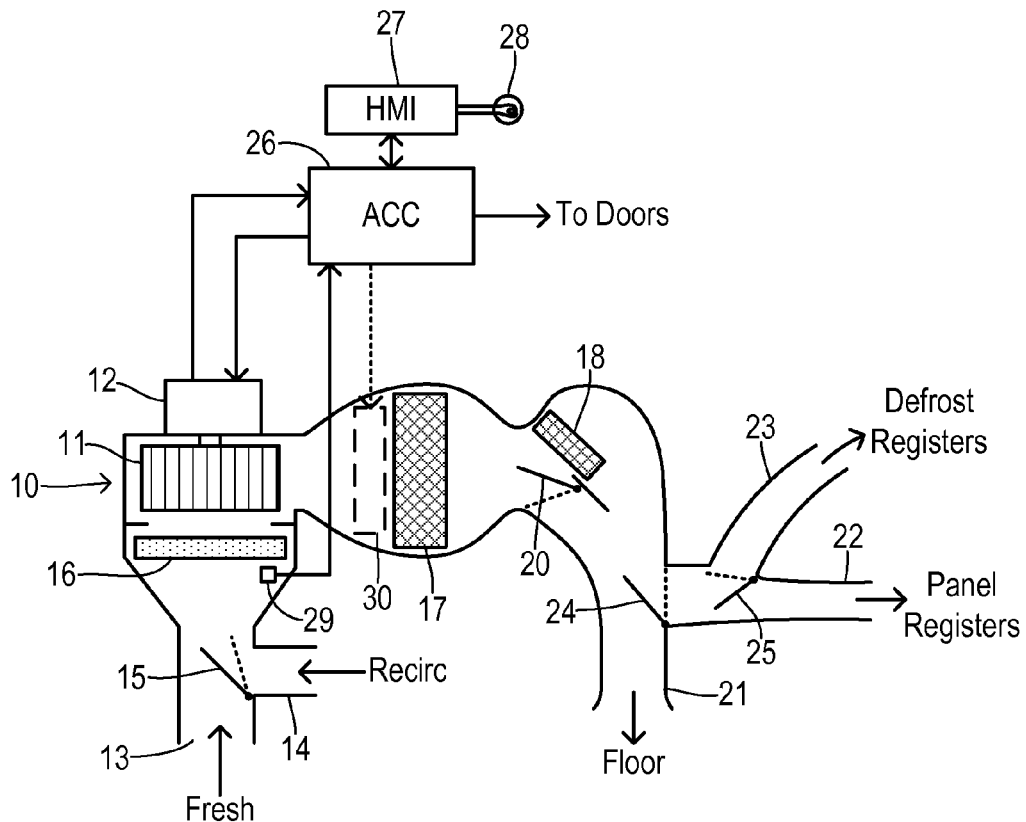
FIG. 1 is a schematic, block diagram showing an HVAC system equipped with the present invention.

An example system for implementing the present invention is shown in FIG. 1. An HVAC system includes an air handling case 10 having a blower fan 11 driven by a blower motor 12. Blower fan 11 receives either fresh air from an inlet 13 and/or recirculated interior air from an inlet 14 as determined by the placement of a blend door 15. An air filter element 16 is retained in case 10 between inlets 13/14 and blower fan 11. Blower fan 11 provides a driven airflow to an evaporator core 17 in case 10. The driven airflow passes selectably through a heater core 18 as determined by the setting of another door 20. The driven airflow is then selectably output to a floor duct 21, a panel duct 22 supplying panel registers, and/or a defrost duct 23 supplying defrost registers. The circulation is controlled by the setting of doors 24 and 25 in a conventional manner.

An automatic climate controller (ACC) 26 is coupled to a human machine interface (HMI), which may include various knobs, push buttons, dials, graphic/textural displays, and/or indicator lights as commonly used in the art. In particular, an indicator light 28 is provided for being triggered to indicate when a clogged filter has been detected as a reminder to a user to replace the filter. ACC 26 is coupled to blower motor 12 in order to control blower operation (e.g., speed). ACC 26 is coupled to doors 15, 20, 24, and 25 via door actuators (not shown) in order to control a circulation mode, which may include a floor mode, a panel mode, a defrost mode, or a mixed floor/panel or floor/defrost mode as known in the art.

ACC 26 is also connected to a filter replacement sensor 29 which may preferably be comprised of a limit switch for sensing the presence of a filter and/or the opening of a filter compartment in order to determine when a dirty filter may have been removed for replacement. Other possible methods of detecting that the filter has been replaced include providing a user input control or detecting an abrupt improvement in airflow characteristics through the filter.

ACC 26 controls the timing and operation of a moisture purge to remove moisture from evaporator 17. The main reason for performing an evaporator purge has been to reduce fogging of the vehicle glass during a cold start of the vehicle that may result from condensation on the evaporator that occurred after the previous use of the vehicle. The moisture purge operation may include high speed operation of the blower without the compressor running as known in the art. HVAC case 10 may optionally include a dryer mechanism 30 coupled to ACC 26 for performing the evaporator purge. For example, an airflow focuser may be provided for sweeping a concentrated airflow at an accelerated speed over evaporator 17 to enhance the moisture removal. Examples of suitable methods and apparatus for performing an evaporator purge are shown in U.S. Pat. Nos. 6,052,998 and 7,637,031.

Figure 2:
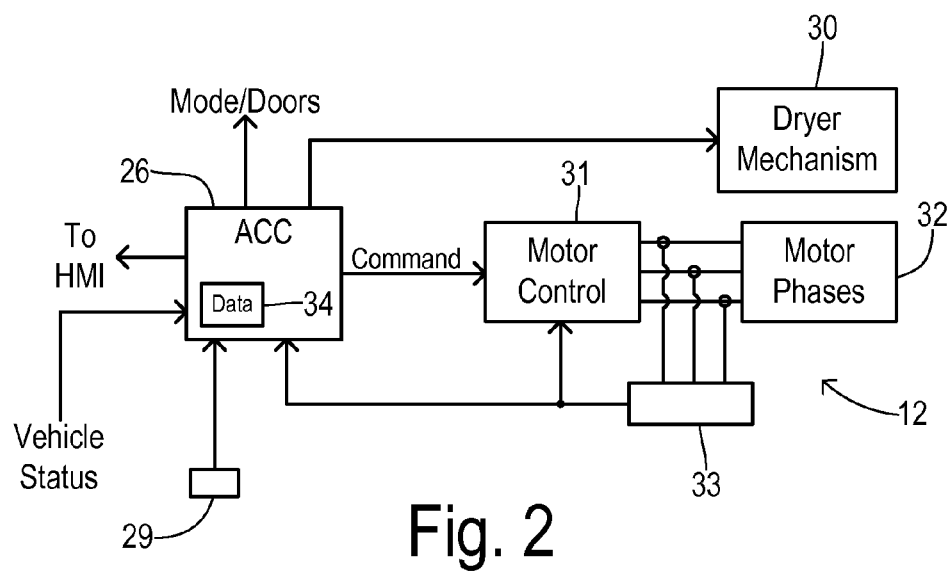
FIG. 2 is a block diagram showing control elements of the invention in greater detail.

One embodiment of the control system of the present invention is shown in greater detail in FIG. 2. Blower motor 12 includes a motor control 31, motor phases 32, and a feedback circuit 33. Motor 12 may preferably include a brushless motor that is regulated by motor control 31 to achieve a predetermined speed by modulating motor torque or power (e.g., the current phase or waveform) supplied to motor phases 32. Feedback circuit 33 may quantify the current flow or other energization parameters which are fed back to motor control 31. The feedback signal is also supplied to ACC 34 for use in monitoring the state of the air filter as explained below.

ACC 26 includes data storage 34 for storing base values in association with one or more baseline conditions in order to detect the clogged or unclogged state of an air filter. ACC 26 receives additional signals indicative of vehicle status, such as the state of an ignition switch, the opened or closed positions of windows or a sunroof, the opened/closed state of the registers, or other parameters that may be used to initiate or defer the monitoring of the air filter (e.g., at a predetermined time such as the beginning or end of a particular drive cycle).

Figures 3, 4:
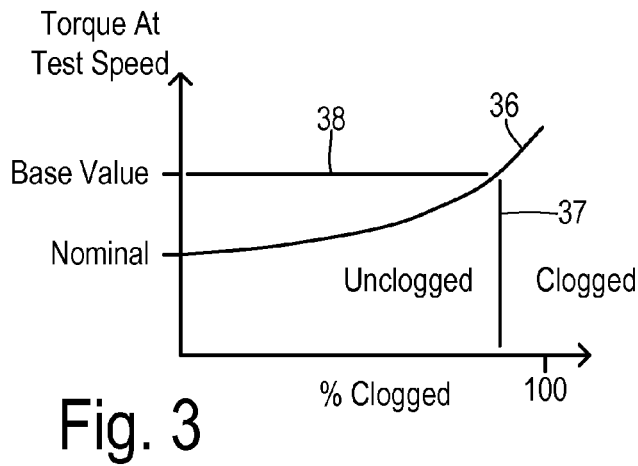
FIG. 3 is a graph showing a relation between blower motor torque and the clogging of an air filter.
FIG. 4 is a table showing various HVAC modes corresponding to different base values as used in certain embodiments of the invention.

As shown in FIG. 3, when operating the blower motor at a predetermined test speed, the motor torque follows an increasing curve 36 as the air filter becomes increasingly clogged. A threshold 37 is selected at a desired contaminate capacity of the air filter to distinguish between an unclogged state and a clogged state. Threshold 37 identifies a base value of the energization (e.g. torque) along a horizontal line 38 that is used to detect the state of the air filter. Thus, one embodiment of the present invention monitors the state of the air filter by operating the motor at a test speed and comparing the applied torque to the base value to infer a clogged state when the applied torque exceeds the base value.

In order to ensure accurate and robust results, the base value is considered valid for only a single baseline condition which includes the placement of the HVAC system into a predetermined circulation mode (e.g., floor mode, register mode, defrost mode, and combinations thereof). The present invention includes embodiments having only one baseline condition which is automatically entered in order to perform monitoring, and it also includes embodiments having a plurality of baseline conditions to allow monitoring to occur in whatever circulation mode the HVAC system happens to be in when the monitoring is initiated. Thus, as shown in FIG. 4, the ACC controller may store a plurality of base values which are indexed onto the baseline conditions according to the circulation mode, the blower speed (e.g., low, medium, or high), and the inlet mode (e.g., recirculated air, fresh air, or a mix) The baseline conditions actually used are determined according to specific HVAC design and an empirical determination of the conditions in which the air flow is sufficiently well controlled in terms of the constancy of airflow resistance contributed by elements other than the air filter. The conditions may further include the open/closed state of the panel registers by providing appropriate sensors.

Figure 5:
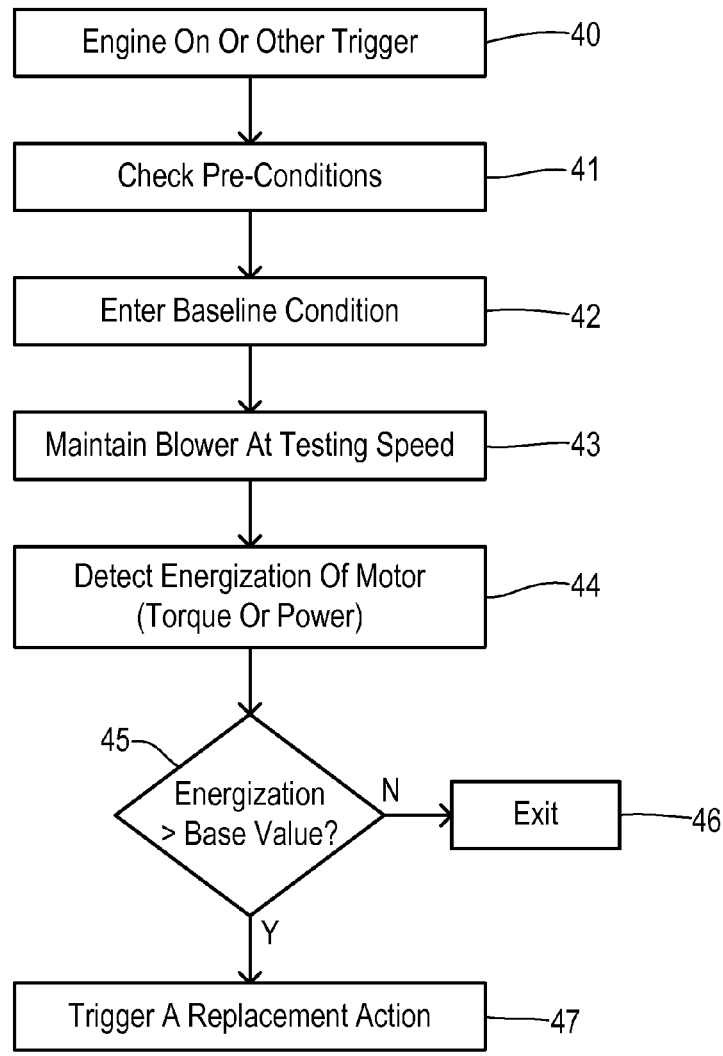
FIG. 5 is a flowchart showing one preferred embodiment of a general method of the invention.

A preferred overall method of the invention is shown in FIG. 5. In step 40, an air filter check is initiated in response to the engine being started or other triggering conditions such as being automatically triggered whenever a moisture purge has occurred (thereby minimizing the need to introduce extra moisture purge operations) or after certain defined intervals. Certain preconditions may be checked in step 41 for ensuring that a filter check can be validly performed, such as checking for proper battery voltage, the presence of an air filter, and the engine being turned off (e.g., after the occupant leaves the vehicle or when the vehicle is not running so that there is no ram air entering the fresh air inlet). The baseline condition is entered in step 42 and a testing speed of the blower is initiated and maintained in step 43. In step 44, energization of the motor is detected. The energization may be comprised of a measurement of motor torque, motor power, or motor current (e.g., phase lead/lag or magnitude of the current). The energization level needed to obtain the testing speed is compared to the base value in step 45. If energization is not greater than the base value (or in some embodiments varies from the base value by greater than a predetermined threshold), then the filter check exits at step 46 without having detected a clogged state. If energization is greater than the base value, then a replacement action is triggered in step 47, such as illuminating an indicator light signifying the need for the user to install a filter replacement.

Figure 6:
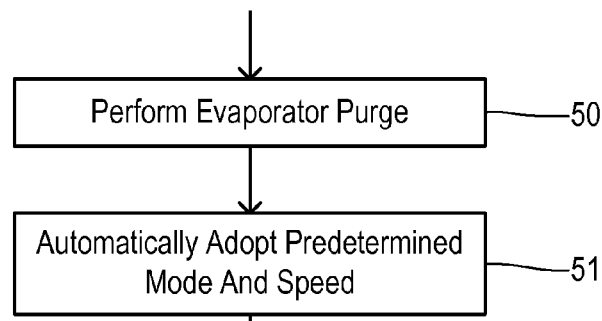
FIG. 6 is a flowchart showing one preferred method of entering a baseline condition for a filter test.

FIG. 6 shows one preferred embodiment for entering the baseline condition of step 42. Thus, an evaporator purge is performed in step 50 in order to remove any airflow resistance that would be caused by moisture buildup on the evaporator. The HVAC system control then automatically adopts a predetermined circulation mode and a blower testing speed that is defined in advance, wherein the mode and speed are selected independently of any user settings. After the filter check, the circulation mode and blower speed may be returned to the user settings.

Figure 7:
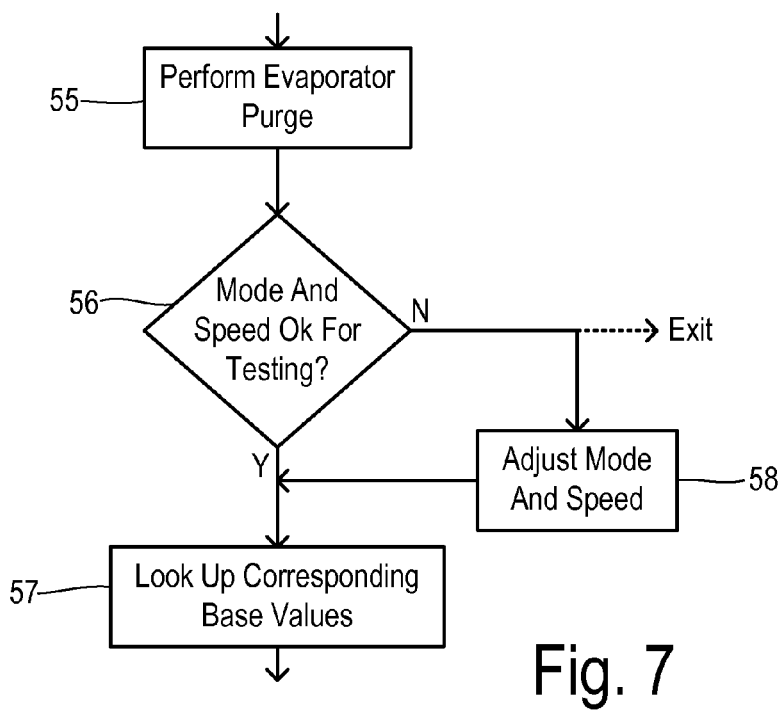
FIG. 7 is a flowchart showing an alternative embodiment of entering a baseline condition for a filter test.

FIG. 7 shows an alternative embodiment which attempts to perform a filter check without the need to alter the user-set circulation mode and blower speed. Thus, after performing the evaporator purge in step 55, a check is made in step 56 to determine whether the existing circulation mode, temperature, and blower speed are acceptable for filter testing (e.g., whether they match the conditions corresponding to one of the stored base values). If the mode and speed correspond to a baseline condition for which a base value has previously identified and stored, then the base value is looked up in step 57 and then the filter check proceeds as described in FIG. with the identified base value. If the current state of the HVAC system is not acceptable for testing in step 56, then filter monitoring may be exited or it may optionally be automatically adjusted to an acceptable mode and speed in step 58 so that the filter check can continue in step 57.

Figure 8:
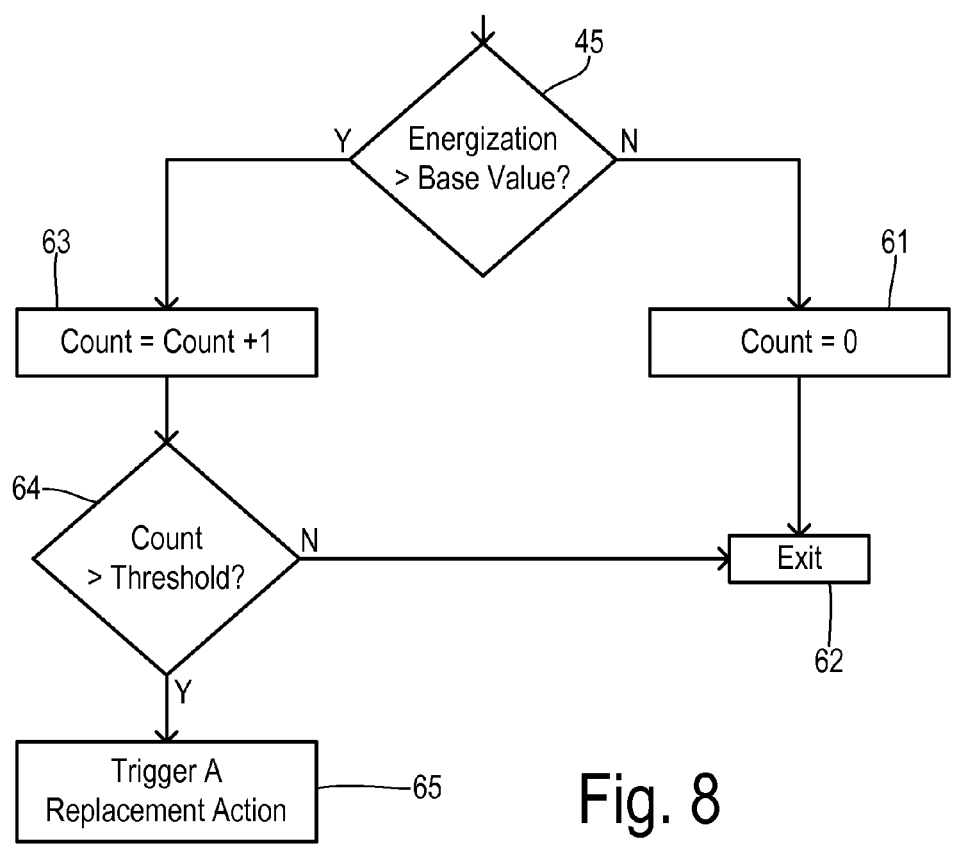
FIG. 8 is a flowchart showing an optional method for enhancing robustness of the detection of a clogged filter.

To guard against possible transient conditions which may impact the detection algorithm, it may be desirable to accumulate the results of several filter checks before triggering a replacement action. Thus, FIG. 8 shows additional steps as follows. If the energization is not greater than the base value in step 45, then a counter variable COUNT is set to zero in step 61 and the filter check is exited at 62. Whenever energization is greater than the base value, then COUNT is incremented by one in step 63. The current value of the COUNT is compared to a threshold in step 64. The threshold may be any suitable value, such as five. If COUNT has not exceeded the threshold, then the filter check exits at 62. If COUNT exceeds the threshold then the replacement action is triggered at 65.

Figure 9:
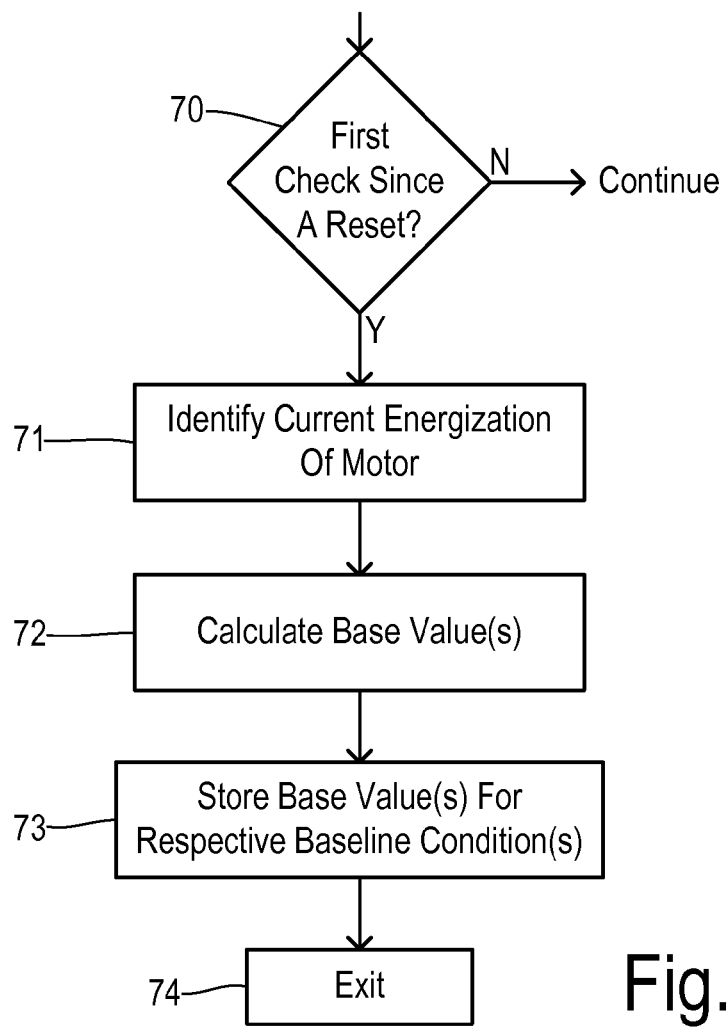
FIG. 9 is a flowchart showing an optional method for calibrating a base value upon replacement of the air filter.

A brushless motor is often used in HVAC blower systems, and it is preferred for the present invention since the relationship between energization and the resulting speed is essentially constant over the life of the blower. If a brushed motor is employed, then the relationship between the energization level and the resulting output speed may degrade over the life of the motor. In this situation, it may be desirable to recalibrate the base value or values during vehicle operation in the field. A recalibration method is shown in FIG. 9. In step 70, a check is made to determine whether the current filter check is the first check being performed since a reset or replacement of the air filter (indicating a maximum unclogged airflow through the filter). If it is not the first check since a reset, then the filter check continues normally as shown in FIG. 5. If the current instance is the first check since a reset, then the current energization of the motor is identified in step 71 and the corresponding baseline value or values are calculated in step 72 as a function of an energization level that is a predetermined amount above the current energization. When a plurality of baseline conditions are being used, the HVAC system would be scanned through each baseline condition in order to calculate all the respective base values. The base value or values are stored as respective baseline conditions in step 73 and the filter check is exited at step 74 to await subsequent filter checks using the newly calibrated base values.

Figure 10:
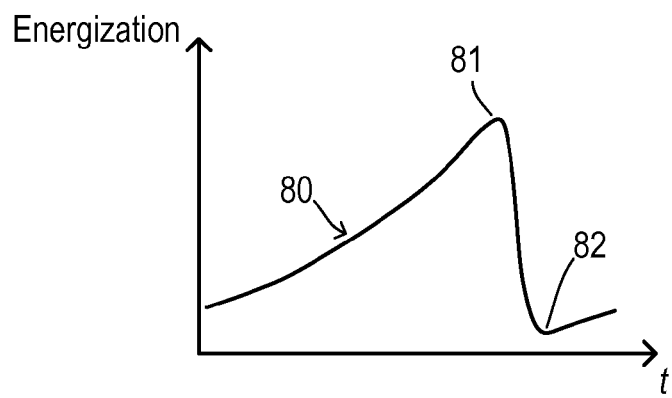
FIG. 10 is a plot showing a change of energization over time of the blower motor to achieve a predetermined speed.

The occurrence of a filter replacement (i.e., reset) can be detected for purposes of step 70 in response to a signal from sensor 29 in FIGS. 1 and 2 or by a manual user action entered via HMI 27. A logic check can also be performed based on a change of the airflow performance through the filter as shown in FIG. 10. The energization of the blower motor necessary to achieve a predetermined speed under the baseline conditions can be plotted over time as a curve 80. As the filter is increasingly clogged, the energization rises to a maximum at 81. After replacement with a new unclogged filter, it becomes easier for the motor to achieve the predetermined speed and the energization drops at 82. By detecting the sudden drop in energization, the changing of the air filter can be logically inferred.

What is claimed is:

1. A method of monitoring for a clogged or an unclogged state of an air filter in an automotive HVAC system, wherein the HVAC system includes a blower having a blower motor providing a driven airflow, a plurality of outlet registers controllable to provide a plurality of circulation modes, and an evaporator for selectably cooling the driven airflow, wherein the air filter passes the driven airflow, the method comprising the steps of:
   entering a baseline condition, wherein the baseline condition includes applying a moisture purge to the evaporator and selection of a predetermined circulation mode;
   controlling the blower motor to maintain a testing speed;
   quantifying an energization of the blower motor while maintaining the testing speed;
   comparing the energization to a base value derived according to the baseline condition with the air filter in an unclogged state;
   triggering a replacement action when the energization is greater than the base value; and
   wherein the method of monitoring of the air filter is performed in a plurality of baseline conditions each corresponding to a respective circulation mode, wherein a plurality of base values are stored according to respective baseline conditions, and wherein the method further comprises the step of selecting a base value for use in the comparing step according to the predetermined circulation mode present in the HVAC system.

2. The method of claim 1 wherein the HVAC system further includes inlets for selecting a fresh mode or a recirculation mode, and wherein the baseline condition further includes selection of either the fresh mode or the circulation mode.

3. The method of claim 1 wherein the energization is comprised of a motor torque.

4. The method of claim 1 wherein the energization is comprised of a motor current.

5. The method of claim 1 wherein the baseline condition is automatically entered by the HVAC system, and wherein the predetermined circulation mode is comprised of a floor mode.

6. The method of claim 5 wherein the predetermined circulation mode is further comprised of a recirculation mode.

7. The method of claim 1 wherein the moisture purge is comprised of a blowoff operation of the blower.

8. The method of claim 1 wherein the testing speed is automatically selected by the HVAC system.

9. The method of claim 1 wherein the testing speed is manually set.

10. The method of claim 1 further comprising the steps of:
    detecting a replacing of the air filter; and
    recalibrating the base value in response to detecting the replacement.

11. The method of claim 1 wherein the replacement action is comprised of a human perceptible signal.

12. An HVAC system for an automotive vehicle, comprising:
    a blower having a blower motor providing a driven airflow;
    a plurality of outlet registers controllable to provide a plurality of circulation modes;
    an evaporator for selectably cooling the driven airflow;
    an air filter for passing the driven airflow;
    a controller configured to monitor for a clogged or an unclogged state of the air filter by performing the steps of:
       entering a baseline condition, wherein the baseline condition includes applying a moisture purge to the evaporator and selection of a predetermined circulation mode;
       controlling the blower motor to maintain a testing speed;
       quantifying an energization of the blower motor while maintaining the testing speed;

comparing the energization to a base value derived according to the baseline condition with the air filter in an unclogged state;

triggering a replacement action when the energization is greater than the base value; and monitoring the air filter in a plurality of baseline conditions each corresponding to a respective circulation mode, wherein the controller stores a plurality of base values according to respective baseline conditions, and wherein the controller selects a base value for use in the comparing step according to the predetermined circulation mode present in the HVAC system.

13. The HVAC system of claim 12 further comprising inlets for selecting a fresh mode or a recirculation mode, wherein the baseline condition further includes selection of either the fresh mode or the circulation mode.

14. The HVAC system of claim 12 wherein the energization is comprised of a motor torque.

15. The HVAC system of claim 12 wherein the energization is comprised of a motor current.

16. The HVAC system of claim 12 wherein the baseline condition is automatically entered by the controller, and wherein the predetermined circulation mode is comprised of a floor mode.

17. The HVAC system of claim 16 wherein the predetermined circulation mode is further comprised of a recirculation mode.

18. The HVAC system of claim 12 wherein the moisture purge is comprised of a blowoff operation of the blower.

19. The HVAC system of claim 12 further comprising an interface for providing a human perceptible signal as the replacement action.

20. The HVAC system of claim 12 wherein the controller further performs the steps of:

detecting a replacing of the air filter; and recalibrating the base value in response to detecting the replacement.

21. A method of monitoring for a clogged or an unclogged state of an air filter in an automotive HVAC system, wherein the HVAC system includes a blower having a blower motor providing a driven airflow, a plurality of outlet registers controllable to provide a plurality of circulation modes, and an evaporator for selectably cooling the driven airflow, wherein the air filter passes the driven airflow, the method comprising the steps of:

a) entering a baseline condition, wherein the baseline condition includes applying a moisture purge to the evaporator and selection of a predetermined circulation mode;

b) controlling the blower motor to maintain a testing speed;

c) quantifying an energization of the blower motor while maintaining the testing speed;

d) comparing the energization to a base value derived according to the baseline condition with the air filter in an unclogged state to obtain a comparison value;

e) repeating steps a, b, c, and d to obtain at least one subsequent comparison value;

f) triggering a replacement action when the comparison value and the at least one subsequent comparison value indicates the energization is greater than the base value; and wherein the method of monitoring the air filter is performed in a plurality of baseline conditions each corresponding to a respective circulation mode, wherein a plurality of base values are stored according to respective baseline conditions, and wherein the method further comprises the step of selecting a base value for use in the comparing step according to the predetermined circulation mode present in the HVAC system.

22. The method of claim 21 wherein at least four subsequent comparison values are obtained; and triggering a replacement action when the comparison value and the at least four comparison values indicate the energization is greater than the base value.

\* \* \* \* \*